US008109532B2

(12) United States Patent
Schirm et al.

(10) Patent No.: US 8,109,532 B2
(45) Date of Patent: Feb. 7, 2012

(54) MOTOR VEHICLE WITH A-PILLAR AND AIRBAG MOUNTED THEREIN

(75) Inventors: Sven Schirm, Oestrich-Winkel (DE); Markus Kreisl, Roth (DE)

(73) Assignee: GM Global Technology Operations LLC, Detroit, MI (US)

( * ) Notice: Subject to any disclaimer, the term of this patent is extended or adjusted under 35 U.S.C. 154(b) by 168 days.

(21) Appl. No.: 12/437,202

(22) Filed: May 7, 2009

(65) Prior Publication Data

US 2010/0001496 A1    Jan. 7, 2010

(30) Foreign Application Priority Data

May 7, 2008    (DE) .......................... 10 2008 022 427

(51) Int. Cl.
*B60R 21/213* (2011.01)

(52) U.S. Cl. ................ 280/730.2; 296/193.06; 296/1.08

(58) Field of Classification Search ............... 280/730.2, 280/728.2, 728.3; 296/39.1, 193.06, 1.08
See application file for complete search history.

(56) References Cited

U.S. PATENT DOCUMENTS

| | | | | |
|---|---|---|---|---|
| 5,791,683 | A * | 8/1998 | Shibata et al. ............. | 280/730.2 |
| 5,791,716 | A * | 8/1998 | Takagi et al. ............... | 296/39.1 |
| 6,142,509 | A | 11/2000 | White, Jr. et al. | |
| 6,152,485 | A * | 11/2000 | Kato ............................. | 280/749 |
| 6,234,517 | B1 * | 5/2001 | Miyahara et al. .......... | 280/730.2 |
| 6,296,269 | B1 * | 10/2001 | Nagai et al. ................ | 280/728.2 |
| 6,333,515 | B1 * | 12/2001 | Kubota et al. .............. | 280/730.2 |
| 6,796,576 | B2 * | 9/2004 | Aoki et al. .................. | 280/730.2 |
| 7,621,556 | B2 | 11/2009 | Itakura | |
| 7,845,713 | B2 * | 12/2010 | Terai et al. ................. | 296/193.06 |
| 2001/0052210 | A1 | 12/2001 | Mizutani et al. | |
| 2002/0167152 | A1 | 11/2002 | Preisler et al. | |
| 2003/0006592 | A1 | 1/2003 | Yasuhara et al. | |
| 2004/0094938 | A1 | 5/2004 | Ryu | |
| 2005/0116447 | A1 | 6/2005 | Ryu | |

(Continued)

FOREIGN PATENT DOCUMENTS

DE    10004483 A1    9/2000

(Continued)

OTHER PUBLICATIONS

German Patent Office, German Search Report for German Application No. 102008022427.8, Apr. 14, 2010.

(Continued)

*Primary Examiner* — Drew Brown
(74) *Attorney, Agent, or Firm* — Ingrassia Fisher & Lorenz, P.C.

(57) ABSTRACT

A motor vehicle is provided with a passenger cell having an A-pillar, which is arranged laterally of a windshield of the vehicle, and includes, but is not limited to bracing connected with the A-pillar, and the A-pillar and the bracing are connected and spaced from each other with a sidewall part of the passenger cell, and on a side facing the passenger interior a covering part is arranged which is connected with the A-pillar. An airbag is provided within the A-pillar and mounted between the A-pillar and the covering part and extends forward to beyond the contact region of the bracing on the A-pillar. The covering part covers the airbag, and with the bracing a further covering part is connected and the two covering parts are detachably connected with each other.

4 Claims, 3 Drawing Sheets

U.S. PATENT DOCUMENTS

| | | |
|---|---|---|
| 2005/0253366 A1* | 11/2005 | Uno et al. .................. 280/730.2 |
| 2007/0108742 A1 | 5/2007 | Itakura |
| 2008/0224453 A1* | 9/2008 | Downey ..................... 280/728.3 |

FOREIGN PATENT DOCUMENTS

| | | |
|---|---|---|
| DE | 102005016993 A1 | 11/2006 |
| DE | 102006053990 A1 | 5/2007 |
| DE | 102006002467 A1 | 7/2007 |
| EP | 0983915 A2 | 3/2000 |
| EP | 1291249 A2 | 3/2003 |
| EP | 1419940 A1 | 5/2004 |
| EP | 1876070 A2 | 1/2008 |

OTHER PUBLICATIONS

British Patent Office, British Search Report for British Application No. 0907593.8, Aug. 6, 2009.

* cited by examiner

MOTOR VEHICLE WITH A-PILLAR AND AIRBAG MOUNTED THEREIN

CROSS-REFERENCE TO RELATED APPLICATION

This application claims priority to German Patent Application No. 102008022427.8, filed May 7, 2008, which is incorporated herein by reference in its entirety.

TECHNICAL FIELD

The invention relates to a motor vehicle with a passenger cell having an A-pillar which is arranged laterally of a windshield of the vehicle, and comprises bracing connected with the A-pillar, and the A-pillar and the bracing are connected with a sidewall part of the passenger cell spaced from each other, and furthermore on the side facing the vehicle interior a (first) covering part is arranged.

BACKGROUND

A current trend in vehicle design—especially with vans or mini vans—is to laterally providing a small triangular window or a triangular design element in the front region of the passenger cell. The triangular design element is more preferably painted in the vehicle color. This triangular element is fitted in the triangular space formed between A-pillar, bracing and sidewall part.

The purpose of the bracing is to brace the A-pillar. This must more preferably be seen under the aspect of forming a passenger cell where the windshield is arranged quite flat and the A-pillar extends as far as the B-pillar of the passenger cell arranged behind the front door of the motor vehicle.

A motor vehicle of the kind mentioned at the outset is known from DE 10 2005 016 993 A1. There, the A-pillar is also called A1-pillar while the bracing connected with this pillar is called A2-pillar. With this motor vehicle the A1-pillar is covered by a facing which is fastened to the A1-pillar via clips.

Motor vehicles, more preferably passenger motor vehicles, are equipped with a plurality of airbags which in the event of a crash are to protect the vehicle occupants. In the region of the A-pillar and the region of the passenger cell on the roof side adjacent to the doors or the side windows one or a plurality of head airbags, so-called roof rail airbags are arranged, which are arranged between a covering part or covering parts and the mentioned region of the passenger cell. Upon triggering of the airbag the covering part, under the effect of the unfolding airbag, is moved away from the passenger cell, more preferably the A-pillar, and the airbag emerges into the head space region of the vehicle interior. Here it has to be ensured that the covering part is not detached. It has thus to be to prevented that the covering part upon the triggering of the airbag is freely flung away. Covering parts for airbags in motor vehicles, more preferably in connection with head airbags are described in DE 10 2006 002 467 A1 and US 2005/0116447 A1.

At least one object of the present invention is to further develop a motor vehicle of the kind mentioned at the outset so that unfolding of an airbag in the connecting region of A-pillar and bracing is simply and safely guaranteed. In addition, other objects, desirable features, and characteristics will become apparent from the subsequent summary and detailed description, and the appended claims, taken in conjunction with the accompanying drawings and this background.

SUMMARY

The at least one object, other objects, desirable features, and characteristics is provided within the A-pillar the airbag is mounted which is arranged between the A-pillar and the first covering part and extends forward as far as beyond the region of engagement of the bracing on the A-pillar, and the first covering part covers the airbag and with a further, second covering part is connected with the bracing, and the two covering parts are detachably connected with each other.

Notwithstanding the special situation that the bracing is connected with the A-pillar and the airbag reaches forward beyond this bracing, the detachable connection of the two covering parts makes possible their deliberate separation upon the unfolding of the airbag, more preferably roof rail airbags. Since the airbag can thus further unfold in the direction of the vehicle front a substantially better protection of the vehicle occupants placed in the front region of the vehicle upon overturning of the vehicle (roll over protection) is obtained.

Because of the configuration according to an embodiment of the invention the first covering part can cover the airbag but opening of the airbag is still possible in an uncomplicated manner since upon triggering of the airbag under the effect of said airbag the connection between the two covering parts is released.

According to a particular embodiment of the invention it is provided that the second covering part extends over a part length of the first covering part. The second covering part thus does not only cover the bracing but extends over a part region of the A-pillar. More preferably it is provided that the second covering part extends at least over the region of the first covering part which in the connecting region of the two covering parts covers the airbag. Upon triggering of the airbag it is thus possible in a simple manner to separate the connection of the two covering parts in the active region of the airbag. Upon triggering of the airbag a slit is thus formed between the two covering parts which expands in accordance with the progressing expansion of the airbag so that the airbag can emerge into the interior of the passenger cell.

Preferentially the first and the second covering part are arranged in an overlapping manner in the region covering the airbag, more preferably the first covering part is arranged outside in the overlapping region. This overlapping region is best suited to accommodate elements for connecting the two covering parts. So it is more preferably provided that the two covering parts are connected with each other by way of positive connection elements. This makes it possible to release the covering parts upon the triggering of the airbag in a particularly simple manner. Aside from this, simple mounting of the two covering parts on the A-pillar and the bracing is possible with this kind of connection of the covering parts. It is particularly advantageous if the two covering parts connected with each other are fastened as unit with the A-pillar and the bracing.

According to a preferred embodiment it is provided that the one connecting part in the overlapping region with the other connecting part is provided with projections, more preferably cylindrical towers and the other covering part towards a lateral edge of this covering part comprises open clearances for the engaging accommodation of the projections. Upon triggering of the airbag a force acts on the two covering parts so that the projections are moved in the direction of the lateral edges of the covering part having clearances, the engagement is cancelled in the process, so that the respective projection can be moved out of the clearance accommodating said projection.

In the sense of the present description an airbag means the airbag function unit as a whole, this means that it does not only cover the unfolding airbag but also suspensions or fastenings of the airbag or the airbag in total in the A-pillar. The airbag is for example embodied as curtain airbag.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background and summary or the following detailed description.

Figure 1:
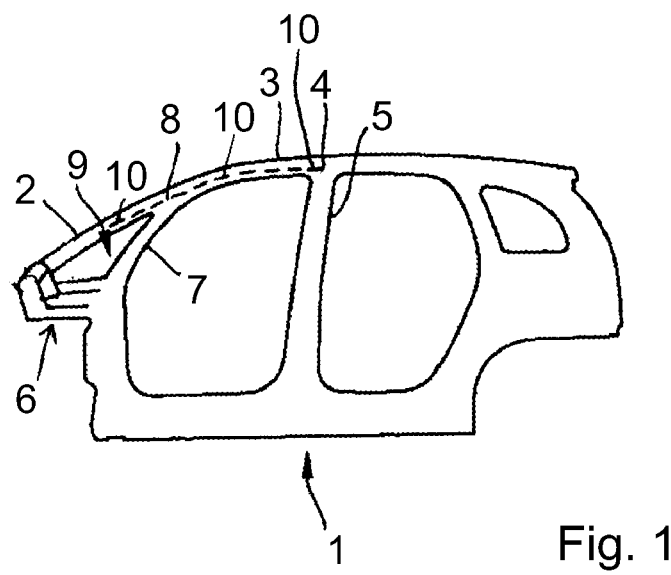
FIG. 1 is a schematic representation a passenger cell of a motor vehicle in a lateral view.

FIG. 1 shows a passenger motor vehicle passenger cell 1, with an A-pillar 2, which is arranged laterally of a windshield of the vehicle, wherein this A-pillar, because of the relatively flat course of the windshield is likewise arranged flat and extends into the front roof region 3 of the passenger cell 1, which forms a junction 4 with the B-pillar 5 of the passenger cell 1 located behind the vehicle door. It is quite possible that the front roof region 3 is not formed but the A-pillar 2 reaches as far as the junction 4.

At the front the A-pillar is connected with a sidewall part 6 of the passenger cell 1. Approximately at half the length of the A-pillar 2 a bracing acts on said A-pillar which, starting from the junction 8 formed between the A-pillar 2 and bracing 7 follows a steeper course than the A-pillar 2. The lower end of the bracing 7 is likewise connected with the sidewall part 6. In this manner a triangular opening 9 is formed between the sidewall part 6, the A-pillar 2 and the bracing 7. A side window can be inserted in said opening. The side window is generally held in a frame which is inserted in the opening 9 and connected with the A-pillar 2, the bracing 7 and the sidewall part 6.

In the passenger cell 1 various airbags for the protection of the vehicle occupants are mounted. A head airbag—roof rail airbag 10—illustrated through a dashed line extends starting from the junction 4 in the region of the B-pillar 5 along the front roof region 3 of the passenger cell 1 and along the A-pillar 2 forward beyond the junction 8 approximately as far as half way between the junction 8 and the connection of the A-pillar 2 to the sidewall part 6. The airbag 10 is mounted in the A-pillar 2 and in the front roof region 3. It extends forward beyond the junction 8 in the region of the bracing 7.

Figure 2:
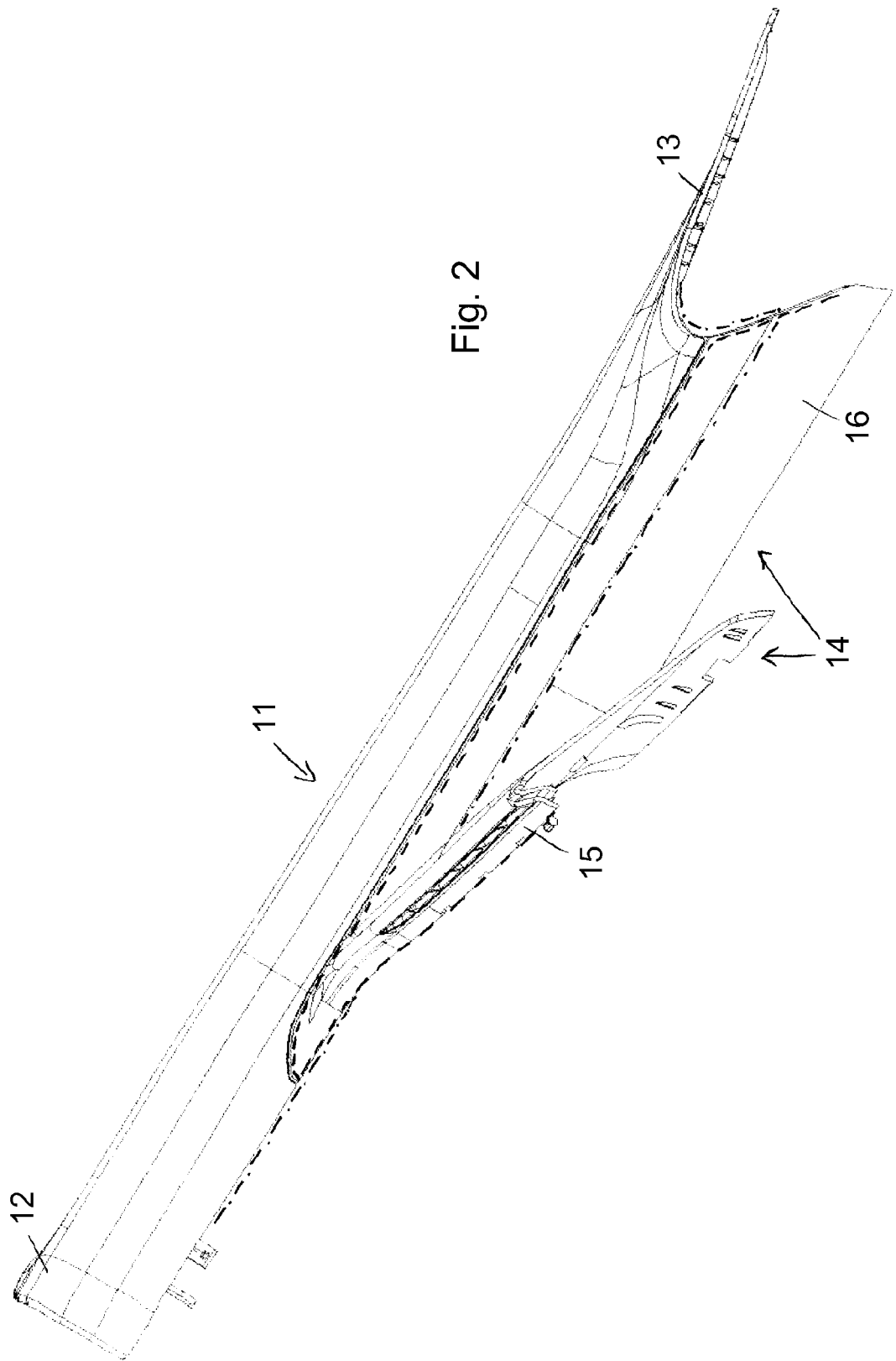
FIG. 2 is a three-dimensional view the two covering parts connected with each other provided according to an embodiment of the invention.
Figure 3:
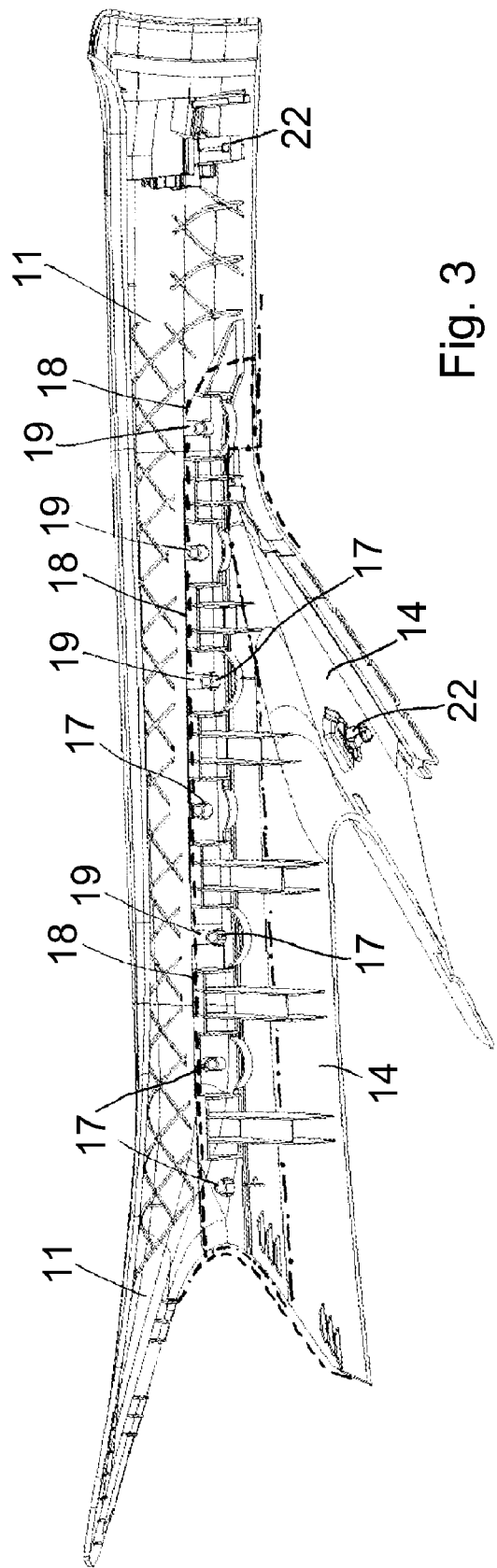
FIG. 3 is the covering parts shown in FIG. 2 shown in another three-dimensional view.

According to an embodiment of the invention, both the A-pillar 2 as well as the bracing 7 are covered on their side facing the interior of the vehicle, whereby the airbag 10, which more preferably is embodied as curtain airbag, is also covered. The covering and its design is shown in FIG. 2 to FIG. 4.

Shown is a first covering part 11 which extends over the entire length of the A-pillar 2, and the front region of this covering part 11, which is positioned mounted in the region of the sidewall part 6, is designated with the reference 12, the other end of the first covering part 11, which abuts a connecting part for the front roof region 3 which is not shown, is designated with the reference 13. A second connecting part 14 is connected in an engaging manner with the first connecting part 11. The second connecting part has two legs. A first leg 15 serves for the covering of the bracing 7, a second leg 16, which corresponding to the angle runs between the A-pillar 2 and the bracing 7 with regard to the first leg 15, serves for the partial covering of the A-pillar 2. This second leg 16 of the second connecting part 14 overlaps the first connecting part 11 over a part length, starting from its end 13 specifically over a length that corresponds to the extension of the airbag 10 in longitudinal direction between A-pillar 2 and first covering part 11. To facilitate understanding, the edge contour of the covering part 11 in the overlapping region is dash-dotted in FIG. 2 and FIG. 3, the edge contour of the covering part 14 in the overlapping region is shown dashed. The overlapping width of the first covering part 11 and leg 16 of the second covering part 14 is selected so that in the overlapping region the positive connection elements for joining the two covering parts 11 and 14 can be accommodated. FIG. 3, which shows the arrangement of the two covering parts 11 and 14 from the inside, thus the side of the covering parts facing the airbag, more preferably the first covering part 11, explains that a plurality of projections which are embodied as cylindrical towers 17 are connected with the first covering part 11. These towers extend vertically to the covering part 11. In the overlapping region of the second leg 16 the second covering part 14 is provided with clearances 19 which are open towards the lateral edge 18 of the leg 16, and the respective clearance 19 serves for the engaging accommodation of a tower 17.

Figure 4:
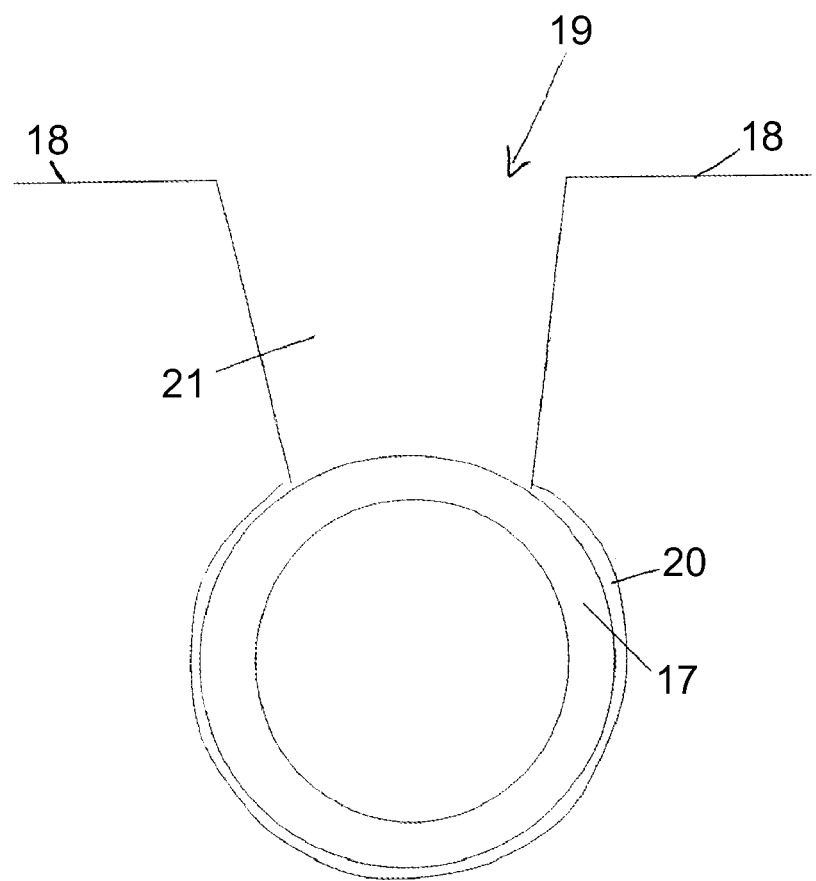
FIG. 4 is a detail view of an engagement region of the two covering parts.

As can be seen from FIG. 4, which explains an enlarged representation of the arrangement of the two connecting parts 11 and 14 in the region of a tower 17 and a clearance 19, the covering part 14 in the region of its end facing away from the lateral edge 18 comprises a circular clearance region 20 whose cross section is slightly larger than the cross section of the cylindrical tower 17 passing through the cross section. This region 20 is followed by a region 21 towards the lateral edge 18 whose cross section for achieving the engagement function is smaller than the cross section of the tower 17. Upon triggering of the airbag 10 a force is exerted on the two covering parts 11 and 14, specifically the covering part 11 and the leg 16 of the second covering part 14 which force brings about that subject to the cancellation of the engagement function of the respective tower 17 the associated clearance 19 in the region 21 expands so that the tower 17 is moved out of the clearance 19. Thus with progressive unfolding of the airbag 10 the overlap between covering part 11 and leg 16 of the covering part 14 is cancelled and the airbag 10 passes through between the two covering parts. The two covering parts 11 and 14 are held on the A-pillar 2 and the bracing 7 via clip connections 22 and additionally in the region of the end 13 the covering part 11 in a covering part of the front roof region 3 which is not shown. The covering parts 11 and 14 preferentially consist of plastic, are more preferably embodied as injection molded parts. The function unit formed of the two covering parts 11 and 14 thus covers the A-pillar 2 and the bracing 7, and their cross section is substantially U-shaped.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle, comprising:
   a passenger cell having an A-pillar that is arranged laterally of a windshield of the motor vehicle;
   a bracing connected with the A-pillar;
   a sidewall part of the passenger cell that spaces the A-pillar and the bracing,
   a side facing of an interior of the motor vehicle and a first covering part connected with the A-pillar;
   an airbag mounted on the A-pillar that is arranged between the A-pillar and the first covering part and extends forward beyond an area of action of the bracing on the A-pillar,
   wherein the first covering part is adapted to cover the airbag, and with the bracing a second covering part is connected and the first covering part and the second covering part are detachably connected with each other; and
   wherein the second covering part partially extends over a length of the first covering part, wherein the second covering part extends at least over a first region of the first covering part, and wherein the first region covers the airbag.

2. The motor vehicle according to Claim 1, wherein the first covering part and the second covering part in the first region are arranged in an overlapping manner.

3. The motor vehicle according to claim 2, wherein the first covering part in the first region is provided with projections and the second covering part to a lateral edge of the second covering part comprises an open clearance for an engaging accommodation of the projections.

4. The motor vehicle according to claim 1, wherein the first covering part and the second covering part are connected with each other by way of a positive connection.

* * * * *